United States Patent [19]

Grutsch et al.

[11] 4,292,176
[45] Sep. 29, 1981

[54] USE OF ACTIVATED CARBON IN WASTE WATER TREATING PROCESS

[75] Inventors: James F. Grutsch, Hammond; Russell C. Mallatt, Crown Point, both of Ind.

[73] Assignee: Standard Oil Company (Indiana), Chicago, Ill.

[21] Appl. No.: 178,139

[22] Filed: Aug. 14, 1980

Related U.S. Application Data

[63] Continuation-in-part of Ser. No. 748,553, Dec. 8, 1976, abandoned.

[51] Int. Cl.³ .............................................. C02F 3/08
[52] U.S. Cl. ................................. 210/616; 210/624; 210/631; 210/694
[58] Field of Search .............................. 210/615–618, 210/620–631, 670, 679, 694, 743, 806

[56] References Cited

U.S. PATENT DOCUMENTS

| | | | |
|---|---|---|---|
| 3,803,029 | 4/1974 | Blecharczyk | 210/694 X |
| 3,904,518 | 9/1975 | Hutton et al. | 210/618 |
| 4,073,722 | 2/1978 | Grutsch et al. | 210/624 |
| 4,076,615 | 2/1978 | Olesen et al. | 210/616 |
| 4,168,228 | 9/1979 | Mallatt et al. | 210/616 |
| 4,172,781 | 10/1971 | Walk et al. | 210/626 |
| 4,207,179 | 6/1980 | McCarthy et al. | 210/631 X |

OTHER PUBLICATIONS

Rizzo, "Case History: Use of Powdered Activated Carbon in an Activated Sludge System", Proc. of Open Forum on Management of Petroleum Refinery Wastewaters.

Grieves et al., "Powdered Activated Carbon Enhancement of Activated Sludge for BA7 Refinery Wastewater Treatment", presented at Joint EPA-API-N-PRA-U7 Second Open Forum on Management of Petroleum Refinery Wastewater, Jun. 1977.

*Primary Examiner*—Thomas G. Wyse
*Attorney, Agent, or Firm*—Frank J. Sroka; William T. McClain; William H. Magidson

[57] ABSTRACT

Disclosed is a process for treating waste water through the use of activated carbon. The carbon is generally added to waste water having a pH from about 4 to about 11, and is commonly added after the waste water has undergone primary treatment. Preferred modes of operation comprise using low concentrations of activated carbon having a high surface area and a zeta potential greater than about −10 millivolts. It is also preferred to use activated carbon in conjunction with an activated sludge process having an average sludge age greater than about ten days, especially where the waste water undergoes a pretreatment prior to the activated sludge process to reduce chemical oxygen demand, oil and solids content. Low concentrations of activated carbon based on feed waste water are generally used while maintaining substantially higher carbon concentrations in the process.

65 Claims, 1 Drawing Figure

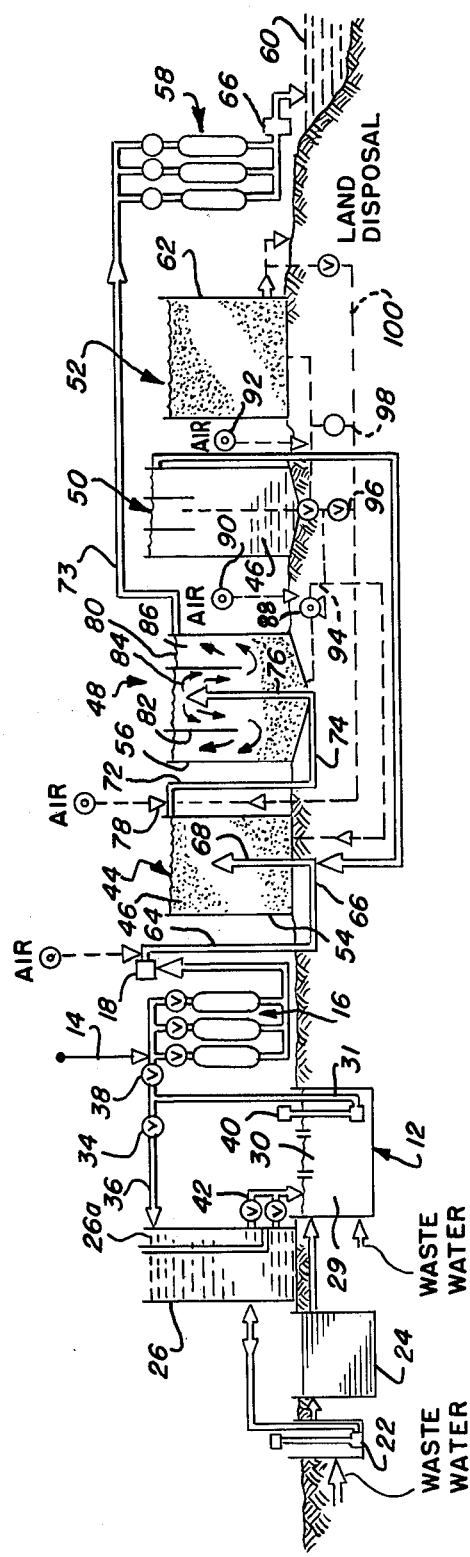

USE OF ACTIVATED CARBON IN WASTE WATER TREATING PROCESS

RELATED APPLICATIONS

This application is a continuation-in-part application of U.S. Ser. No. 748,553 filed Dec. 8, 1976, abandoned, and is related to U.S. Ser. No. 37,733 filed May 10, 1979, abandoned.

BACKGROUND OF THE INVENTION

This invention relates to the treatment of waste water, such as, for example, municipal or industrial waste water. This invention is especially useful in biological processes for treating waste water.

The treatment of contaminated waste water from municipal or industrial sources involves a sequence of processing steps for maximizing water purification at minimum costs. Industrial effluents, particularly waste water from oil refineries, include a broad spectrum of contaminants, and, consequently, such waste water is usually more difficult to decontaminate than waste water from municipal sewage systems. Four main sequential process treatments are used to decontaminate such industrial effluents although similar treatment is given municipal effluents, or combined municipal/industrial effluents. These are primary, intermediate, secondary, and tertiary treatments. The primary treatment calls for removal of gross amounts of oil and grease and solids from the waste water. In the oil industry, usually separators of American Petroleum Institute design are employed for removal of free, separable oil and solids. In municipal waste water treatment, generally little free oil is present but solids removal is still needed. The intermediate treatment is the next process and it is designed to adjust water conditions so that the water entering the secondary treatment zone will not impair the operation of the secondary treatment processes. In other words, intermediate treatment is designed to optimize water conditions so that the secondary treatment process will operate most efficiently. The secondary treatment calls for biologically degrading dissolved organics and ammonia in the water. One of the most common biological treatment processes employed is the activated sludge process discussed below in greater detail. The tertiary treatment calls for removing residual biological solids present in the effluent from the secondary treatment zone and removing contaminants which contribute to impairing water clarity or adversely affecting water taste and odor. This is usually a filtration of the water, preferably through beds of sand, or combinations of sand and coal, followed by treatment with activated carbon.

The activated sludge process is a conventional waste water treating process which produces the highest degree of biological treatment in reasonably compact facilities at the present time. The application of this process to the treatment of industrial waste water has, however, been slow compared with municipal applications. Industrial applications of this process are nevertheless increasing rapidly. Currently, the activated sludge process is capable of achieving about 85% to 98% reduction in the five-day biological oxygen demand ($BOD_5$). However, the $BOD_5$ contaminants present in industrial waste water are relatively small compared with the total oxygen demanding contaminants present in such waste water as measured by the chemical oxygen demand (COD) test. For example, the $BOD_5$ contaminants present in the effluent from an activated sludge process typically ranges from 10 to 20 parts per million parts of water. It is not uncommon to also find present in such effluent 10 to 20 times this amount of COD.

The activated sludge process generally has at least two, preferably four stages of treatment. In the first stage, contaminated water is contacted with the activated sludge. The sludge includes micro-organisms which feed on the contaminants in the water and metabolize these contaminants to form cellular structure and intermediate products. This decontaminated water flows into a second clarifier stage where suspended sludge particles are separated from the decontaminated water. A portion of the sludge is recycled to the first stage and the remainder can be forwarded to the third and fourth stages as is taught in Grutsch et al., U.S. Pat. No. 4,073,722. This sludge forwarded to the third and fourth stages includes water. In the third stage the sludge is thickened to remove excess water and in the fourth stage the thickened sludge is permitted to digest, that is, the micro-organisms feed upon their own cellular structure and are stabilized. Normally, the average age of these micro-organisms in the sludge is substantially less than ten days.

Activated carbon is sometimes used in tertiary treatment as a final cleanup for purified water from the second stage clarifier. Some have taught that activated carbon or Fuller's earth can be used to treat waste water in a biological treatment process. U.S. Pat. No. 3,904,518 teaches that between about 50 and 1500 parts of activated carbon or between about 250 and 2500 parts of absorptive Fuller's earth per million parts of feed waste water can be beneficial in water purification. The carbon or Fuller's earth has a surface area of at least 100 square meters per gram and the activated carbon usually can have a surface area of between 600–1400 square meters per gram. However, the use of this relatively large amount of carbon is expensive and therefore it has not been widely used.

It is an object of this invention to provide an improved waste water treating process.

It is an object of this invention to provide an economical method of treating waste water through the efficient use of activated carbon.

It is further an object of this invention to provide an integrated waste water treatment process, especially the use of high sludge age in conjunction with activated carbon.

It is still further an object of this invention to provide improved points of addition for activated carbon.

It is still further an object of this invention to provide an activated carbon having good adsorption and separation characteristics.

SUMMARY OF THE INVENTION

This invention relates to the treatment of waste water. Most commonly, the pH of waste water is from about 4 to about 11, or is treated with chemicals so as to adjust the pH into this range. Commonly the waste water contains about 25 to about 15,000 ppm of total suspended solids.

Disclosed is an improved process for treating water in which activated carbon, especially powdered activated carbon is added to the waste water. The preferred activated carbon has a surface area greater than about 1500, more preferably greater than about 2000, and still more preferably greater than about 2500 square meters per gram. Commonly such activated carbon is in powdered form and has a particle size such that at least 50 percent of it will pass through 200 mesh per inch sieve, although generally about 70 to about 99 percent will pass through such a sieve.

In many cases waste water is contacted with about 1 to about 5000 ppm activated carbon, but commonly about 1 to about 500 ppm is used. One especially preferred process for treating waste water through contact with activated carbon comprises adding carbon to the waste water at a concentration of 1 to 40 ppm based on feed water while said carbon is present in the water at a concentration substantially in excess of the addition concentration. This can be accomplished, for example, by recycling activated carbon, especially the recycle of activated carbon with activated sludge.

Activated carbon is generally used in an integrated, multi-step waste water treating process. Waste water is commonly subjected to primary treatment to remove easily removable grease and/or oil and/or solids prior to contacting with activated carbon. In primary treatment, gross amounts of oil, grease and solids are removed from the waste water, for example, by means of separators of American Petroleum Institute design. In treating municipal waste water, generally little oil is present but solids removal is carried out using clarifiers of conventional design. The effluent from this primary treatment typically includes from about 25 to about 150 parts of suspended solids per million parts of water and from about 25 to about 300 parts of oil and grease per million parts of water. In treating municipal waste, the oil level may be even lower. As is not commonly recognized, such waste water containing relatively large amounts of oil and/or solids, cannot be fed directly into an activated sludge process where the sludge age is in excess of about ten days without upsetting the activated sludge process. Generally, if the water entering the activated sludge process contains more than about twenty parts of solids per million parts of water and/or more than about twenty parts of oil and grease per million parts of water, downstream treatment is greatly impaired. In many cases, more than about ten parts per million of solids and/or about ten parts per million of hydrocarbon can be detrimental. Excessive amounts of oil and hydrocarbon can result in gross quantities of oily, emulsified material collecting in the first stage or mixed liquor tank of the activated sludge process. Such oily, emulsified solids impair or prevent the activated sludge from decontaminating the water, causing the effectiveness of the activated sludge process to be substantially diminished. Therefore it is often important to reduce chemical oxygen demand and remove excessive oil and solids from the waste water by intermediate treatment.

After primary treatment, waste water is then commonly subjected to intermediate treatment where excessive solids and/or hydrocarbons are removed, chemical oxygen demand is reduced, and contaminant concentrations are equalized so that such concentrations of contaminants remain more or less constant even though the contaminant concentration in the influent to the equalization treatment stage sharply changes from time to time. If waste water from a petroleum-chemical complex is being treated, it is desirable that the waste streams be combined and then subjected to intermediate treatment. If contaminant concentration in the influent changes and such change is sustained, this will ultimately result in a change in the contaminant concentration in the effluent from the equalization section. In staged equalization zones, this change initially will occur gradually over a relatively long time interval. This permits the microorganisms in the downstream activated sludge process to adapt or acclimate to this change in contaminant concentration while maintaining process purification efficiency.

Intermediate treatment generally includes equalization and filtration. Equalization can be conducted in a basin having two, preferably three or four compartments. These compartments are mixed and arranged in series so that water flows from one compartment to the next succeeding compartment. The total retention time of water in the basin is less than about 10 to 15 hours, preferably 2 to 15 hours maximum. Consequently, heat loss is minimized. Normally, the difference in temperature between the influent and effluent water is 20° F. or less. Preferably the retention time in each compartment is 30 to 300 minutes.

Waste waters from the various sources are mixed in the first compartment, and the contaminant concentration is monitored. Usually pH, toxic metals, COD contaminants, phenolic, and ammonia concentrations are measured either manually or automatically. Since waste waters from multiple sources are fed into the relatively confined space in the first compartment, several advantages occur. First it is easy to monitor contaminant concentration and readily detect any drastic change in concentration indicating, for example, a break in a chemical line. The reason is because the first compartment in a multiple compartment system will more rapidly increase in concentration to more readily detectable levels than a single compartment system. Also, neutralization is achieved. For example, one source of water may be highly acidic and another highly basic. Neutralization occurs as these streams mix in the first compartment. Waste streams from municipal sources generally do not vary greatly in the acid/basic content.

It is important to adjust the pH in the equalization basin in order to maximize oxidation of certain contaminants, particularly sulfides. pH is adjusted by adding acid or base to the water in the second compartment until the water has a pH ranging from about 6.5 to about 9.5, preferably between 7.5 and 8.5. In some cases at least about one part, preferably about three parts, still more preferably about five parts, of dissolved oxygen per million parts of water must be present to satisfy the immediate oxygen demand (IOD) of the contaminants in the water at a reasonable rate of oxidation when certain contaminants such as sulfides are present. Preferably catalysts such as hydroquinone or gallic acid are added to the water to catalyze the oxidation of IOD contaminants. If this IOD is not satisfied, the downstream activated sludge process can be adversely affected. Consequently, the water in the equalization basin is aerated. Conventional floating aerators may be used. Aeration is more effective in a confined zone. About 0.15 or more horsepower per thousand gallons of water generally provides excellent aeration. Aeration also thoroughly agitates and mixes the water with the result that colloidal and suspended oils and solids are mechanically flocculated and accumulate on the water surface. These oily solids are removed by skimming. In order to ensure that the water to the activated sludge process includes less than about twenty parts of hydrocarbon, such as oil and grease, per million parts of water and/or less than about twenty parts of solids per million parts of water, a coagulating and/or flocculating agent is sometimes added to the water in the equalization basin or to the stream of water flowing to the activated sludge process. It is preferable to reduce the solids and/or hydrocarbon content of the waste water to less than about ten parts per million respectively. The coagulating and/or flocculating agent destabilizes colloidal particles which then aggregate. The aggregates are carried with the effluent stream to a filter and removed prior to introduction of the stream to the activated sludge process. Air is preferably introduced into the stream of water flowing into the downstream activated sludge process to ensure that the immediate oxygen demand to the water is satisfied.

It is extremely desirable to substantially reduce chemical oxygen demand prior to biological treatment. Commonly the chemical oxygen demand is reduced by about fifty percent, but preferably by about seventy percent. In a more preferred mode of operation chemical oxygen demand is reduced to essentially the soluble organic component prior to biological treatment.

Water from intermediate treatment generally flows through an activated sludge plant. In preferred activated sludge processes the sludge-water mix flowing between stages of the activated sludge process is aerated, and the sludge of different ages from different stages is recycled to one or more upstream stages of the activated sludge process. Oxygen, either pure or most preferably in air, is introduced, for example, pressurized or most preferably by aspiration into the stream of sludge and water flowing between the mixed liquor tank of the first stage and the clarifier tank of the second stage. This stream of sludge, water and air or oxygen is subjected to the increased pressure created by the hydrostatic heads of water in the mixed liquor and clarifier tanks. Consequently, this stream may be saturated or supersaturated with dissolved oxygen. The dissolved oxygen maintains the sludge in the clarifier tank aerobic and insures that the effluent water to the subsequent tertiary treatment section includes at least about one, preferably at least three, still more preferably five, parts of dissolved oxygen per million parts of water when such oxygen content is necessary. Oxygen, either in air or pure form, may be injected under pressure into the sludge and water streams flowing between the second and third stages and the third and fourth stages of the activated sludge process. Consequently, the sludge in the thickener and digester can be retained for a longer period of time. This aged sludge from the thickener and digester can be recycled to the first stage or mixed liquor tank either directly or preferably by mixing with the stream of sludge and water flowing between the first and second stages.

The effluent from the clarifier or second stage of the activated sludge process is filtered to remove biological solids in the effluent and then may be contacted with activated carbon to remove odor causing and other residual trace components by adsorption. Chemical agents may be added to the clarifier effluent to destabilize colloidal suspensions and assist filtration. However, where interstage aeration has increased the oxygen content of water to at least one, preferably at least three parts, more preferably five parts, of dissolved oxygen per million parts of water, organisms collected in the filter and on the carbon are maintained in an aerobic condition, and odor and any degradation in quality of the filtered effluent is avoided. Further, the effluent water to the receiving stream has a high level of oxygen in it. Thus, it does not contribute to deterioration of the water quality of the receiving stream.

Although activated carbon can be added to any waste water stream there are preferred points of addition in a multistage waste water treatment process. It is common to add activated carbon to the first or second stages of an activated sludge process. It is preferred to introduce activated carbon after the first stage of an activated sludge process, such as to the water leaving the first stage. In this manner, fresh activated carbon is exposed to the equilibrium residual soluble organic contaminants and essentially eliminates any mixing or short circuiting problems in the aeration tank that would expose fresh carbon to incoming organics. This would prevent the adsorption by active sites on the carbon with the wrong organics. The rundown line between first and second stages, when used with a wide-well clarifier can provide extended contact time between the wastes and the carbon.

Another preferred point of addition for activated carbon is after the second stage of the activated sludge process, for example, to the decontaminated water leaving the second stage. In this manner, fresh activated carbon is exposed to essentially only residual soluble contaminants and said carbon will be captured by downstream final filters. The carbon captured by the filters contributes the attributes of a granular media bed to the powdered activated carbon system and exposes carbon for long periods to the residual contaminants, thereby more fully utilizing the adsorptive capacity of the carbon. When the final filters begin to deactivate or clog, they can be backwashed to the first stage so that activated carbon with residual organics resistant to bio-oxidation are returned to the aeration tank, or to the fourth stage or the aerobic stabilization tank. When backwashed to the aerobic stabilization tank, the activated carbon presents a concentrate of resistant organics to the microorganisms for an extended period of time which encourages the proliferation of species capable of metabolizing the resistant organics. Recirculation of a slipstream of this sludge system and combining with the principle sludge mass encourages the reduction of the resistant organics by the principal sludge mass, thereby minimizing the load on fresh activated carbon.

Another preferred point of addition of activated carbon is into the portion of the digested sludge from the fourth stage which is mixed with water and sludge entering the second stage. If the biochemical system for minimizing residual COD resistant to removal depends on exoenzymes from slow reproducing organisms, this point of addition will expose fresh activated carbon to a preferred point in the process for adsorbing these enzymes. Acting as a carrier for these enzymes, the activated carbon provides a means for their capture and incorporation into the sludge mass rather than permitting them to escape in the effluent.

A preferred method of operating a multi-stage waste water treating process is to use activated carbon in conjunction with high sludge age. Generally an average sludge age greater than about 10 days is advisable, preferably greater than about 20 days and still more preferably greater than about 30 days. The higher sludge ages maximize carbon utilization and result in extremely high carbon concentrations, and therefore effective water purification. It is most desirable to operate at sludge ages in excess of 75 days or even 150 days. It should be noted that when adding fresh activated carbon, for example, to the waste water leaving the first stage and also operating at high sludge age, there tends to be an accumulation of carbon in certain parts of the system. This allows the addition of low levels of carbon on a per gallon or per pound of waste water basis, while concentrating the carbon within the system. This leads to better utilization of carbon and higher process effectiveness. Also, high sludge age has the merits of good stability and high effectiveness. In order to operate at a high sludge age, it is preferred that the oil and grease and suspended solids level and chemical oxygen demand be reduced by intermediate treatment as previously discussed.

An example of the use of high sludge age would be in the activated sludge process wherein a first stage contaminated water is contacted with activated sludge for a period of time sufficient to biologically degrade contaminants in the water and in a second stage decontaminated water is separated from the activated sludge. A first portion of said separated sludge is recycled for recontact with the water in the first stage and a second portion of said separated sludge is treated in downstream operations. About 1 to about 500 ppm of activated carbon is introduced into the waste water so that the carbon is present in the first stage, and the first stage is operated at an average sludge age in excess of ten days. Preferably about 1 to about 200 ppm of activated carbon is introduced into the waste water and the first stage is operated at an average sludge age in excess of twenty days. Still more preferably 1 to 40 ppm of activated carbon is introduced into the waste water. Still more preferably the first stage is operated at an average sludge age in excess of thirty days.

Some powdered activated carbons have a high, negative electrical surface charge, for example a zeta potential of $-20$ to $-30$ millivolts. Coulombic repulsive forces keep more and more of the carbon particles in suspension as the size of the carbon particles get smaller. The negative electrical surface charge on filter's granular media also repulses the negatively charged carbon fines and may result in poor filtration efficiency such as the loss of carbon to the effluent. Reducing the electrical charge on carbon particles is important to improving the handling and application of powdered activated carbon.

In view of the above, and the desire to effect essentially total capture of substantially all carbon after the second stage, control of the zeta potential of carbon and control of the electrical charge on the filter media is important. Since the electrical charge of these surfaces is generally negative, control of surface charge can be effected by treating with surface active agents. Cationic types organic surfactants and/or polyelectrolytes can be used to adsorb on the surface of the particle and modify the charge. Examples of such well-known surface active chemicals are fatty diamines, polyalkylene polyamines, dimethyl dialkyl ammonium chloride polymers (DMDAAC), copolymers of DMDAAC and acrylamide, quaternized fatty amines, polyacrylamides, and the like.

Another method of controlling the electrical surface charge on activated carbon is through the incorporation of certain metals into the carbon. Suitable metals are, for example, iron, magnesium, aluminum, tin, zirconium, and thorium. Magnesium is well suited for this purpose because of its effectiveness, low cost and high availability. The amount of metal needed to reduce the zeta potential will depend on the metal and method of incorporation, the type of carbon and method of preparation, and the desired level of reduction in zeta potential.

Common periods for incorporation of metals are during the carbonization or activation steps during the manufacture of activated carbon, or after the activation step such as to the final product. This latter means of metal incorporation can be achieved by simply soaking the activated carbon in a solution of the metal salt. Generally the metal is used in an inexpensive form. When incorporated during carbonization or activation steps, metal oxides, carbonates, inorganic salts, and organometallic salts such as soaps are suitable. When the metal is incorporated by adsorption onto activated carbon, the metal should be applied in a soluble form, then possibly insolubilized by hydrous oxide formation.

An example of introducing Mg into carbon is as follows:
1. Mix 100 gms of petroleum coke fines with a solution of 3 gms of magnesium bicarbonate.
2. Evaporate (1) to dryness.
3. Mix (2) with 15 gms KOH.
4. Evaporate (3) to dryness.
5. Calcine at elevated temperature (perhaps 850° to 910° C.).
6. Wash twice with 400 ml aliquots of water.
7. Dry.
8. Steam activate.
9. Wash.
10. Dry.
11. Grind.

Many noncarbon ingredients exert specific influences during oxidation with steam or air. Thus, step 8 may require activation at temperature and oxidant gas concentrations at conditions different from conventional because the thrust of step 6 is to wash in a manner that leaves Mg but removes KOH.

Examples of incorporation of metals, by treating activated carbon with aqueous solutions of metal salts at room temperature using vacuum to draw the metal ions into the pores of the carbon, follow:

| Carbon | Zeta Potential (mV.) As Manufactured | Treatment with Solution of | Zeta Potential (mV.) |
|---|---|---|---|
| Aqua Nuchar | $-32$ | Ferric Sulfate | $+14$ |
|  |  | Aluminum Sulfate | $+13$ |
| Pittsburg KB | $-25$ | Ferric Sulfate | $+17$ |
|  |  | Aluminum Sulfate | $+17$ |

It is preferred that the carbon has a zeta potential of at least about $-10$ millivolts more preferably about $-5$ to about $+5$ millivolts.

In order to demonstrate the high effectiveness of activated carbon having high surface area, pilot plant tests were run with the addition of powdered activated sludge to the aeration tank of the activated sludge process. Retention time was 15 hours, sludge age was 20 days and the activated carbon was added at 200 mg/ml of waste water.

|  | BET Surface area $m^2/g$ | COD mg/l | TOC mg/l |
|---|---|---|---|
| Influent | — | 176 | 66.7 |
| Control | — | 45 | 22.3 |

-continued

|  | BET<br>Surface area<br>m²/g | COD<br>mg/l | TOC<br>mg/l |
|---|---|---|---|
| Amoco | 3000 | 10 | 9.4 |
| Type A | 500 | 44 | 22.6 |
| Type B | 700 | 21 | 12.5 |

Activated carbon is commercially available. Suitable processes for making activated carbons can be found in U.S. Pat. Nos. 3,709,930; 3,726,808; 3,624,004; 3,642,657; 3,817,874; and 3,833,514, which are hereby incorporated by reference and made a part hereof.

In order to show the benefits of activated carbon, especially high surface area carbon, used in conjunction with intermediate treatment to reduce oil, grease and solids, the following calculation was made. Three cases are examined (1) conventional powdered activated carbon and conventional activated sludge process, (2) Amoco X powdered activated carbon and conventional activated sludge process, and (3) Amoco X powdered activated carbon and filtration prior to conventional activated sludge process to reduce oil, grease and solids. The design bases for comparing the cases are as follows:

| Feed Rate | 3,000,000 gal/day |
|---|---|
| Retention in Aeration tanks | 12 hours |
| Sludge recycle | 1,500,00 gal/day |
| Total COD Case 1 | 195 mg/l |
| Total COD Case 2 | 195 mg/l |
| Soluble COD Case 3 | 53 mg/l |
| F/M | 0.15; equals 40 days sludge age at cell yield of 0.5 and 0.05 endogenous rate |

|  | Case |  |  |
|---|---|---|---|
|  | 1 | 2 | 3 |
| Carbon Addition mg/mg COD | 0.5 | 0.17 | 0.17 |

Percent COD removed by activated sludge assumed to be 81.5 percent.

|  | Case |  |  |
|---|---|---|---|
|  | 1 | 2 | 3 |
| COD removed lbs/day | 3,972 | 3,972 | 1,080 |
| MLVSS lbs | 26,480 | 26,480 | 7,200 |
| lbs carbon added/day | 2,438 | 829 | 225 |
| Equilibrium carbon level at 40 days sludge age (mg/l) | 7,800 | 2,652 | 720 |

For cases 1 and 2, it is assumed inerts accumulate at 20 mg/l, which at 40 days sludge age equals 1,600 mg/l.

|  | Case |  |  |
|---|---|---|---|
|  | 1 | 2 | 3 |
| Total MLSS (lbs) | 144,000 | 79,630 | 16,200 |
| Wastage (lbs/day) | 3,600 | 1,991 | 405 |
| Clarifier solids load (lbs/day) | 431,827 | 238,875 | 48,581 |
| Clarifier area requirement overflow rate 700 gal per day/ft² | 4,286 | 4,286 | 4,286 |
| solids flux rate 50 lbs per day/ft² | 8,637 | 4,778 | 972 |

The following tables for clarifier area requirements were used to relate overflow rates with area.

| gpd/ft² | ft² | Diameter, ft |
|---|---|---|
| 1000 | 3000 | 62 |
| 800 | 3750 | 69.5 |
| 700 | 4286 | 74 |
| 600 | 5000 | 80 |
| 500 | 6000 | 87.5 |
| 400 | 7500 | 98 |
| 356 | 8434 | 104.5 |
| 338 | 8881 | 107 |
| 300 | 10000 | 114 |

| Solids Flux, lbs/D/ft², Vs. Area | | | |
|---|---|---|---|
| lbs/D/ft² | Case 1 | Case 2 | Case 3 |
| 40 | 10796 | 5972 | 1215 |
| 45 | 9596 | 5308 | 1080 |
| 50 | 8637 | 4778 | 972 |
| 55 | 7851 | 4343 | 883 |
| 60 | 7197 | 3981 | 810 |

|  | Case |  |  |
|---|---|---|---|
|  | 1 | 2 | 3 |
| Oxygen supply at 99 percentile lbs COD/day | 8375 | 8375 | 3000 |

At 35 lbs COD/100 c.f. aeration tank, Cases 1 and 2 require 239,286 c.f. and Case 3 requires 85,714 c.f. at 99 percentile. At typical strengths Cases 1 and 2 require 113,486 and Case 3 requires 37,857 c.f. aeration tank capacity. Assuming an overflow rate of 700 gpd/ft as a target design, a 4,286 ft² clarifier is required. Checking the solids flux rates, this is adequate only for Case 3. Cases 1 and 2 require 8,637 and 4,778 sq. ft. for solids flux, much more than for Case 3 where overflow rate sets the requirement. For Case 3, the aeration tank capacity used may be less than 30% that required for Cases 1 and 2. The average energy requirement for supplying $O_2$ for Case 3 is less than $\frac{1}{3}$ that required for Cases 1 and 2.

The savings in reduced clarifier, aeration tank, and aeration equipment will roughly equal the cost of filtration equipment: the capital cost of a treatment sequence using filters will be the same as the historic conventional sequence not using filters.

The benefits of high surface area carbon are apparent by comparing Cases 1 and 2. Since surface area is the critical property, equivalent surface areas are used in Cases 1 and 2 by supplying only about $\frac{1}{3}$ the mass of high surface area carbon to Case 2 to obtain equivalent performance. The important process improvements include the following: (1) less weight (and cost) is associated with using high surface area carbon; (2) a significant reduction in solid waste generation is achieved $((3600-1991)/(3600))\times 100\% = 44.7\%$; and clarifier solids load is reduced also, $((431,827-238,875)/(431,827))\times 100\% = 44.7\%$, which reduces equipment costs.

The benefits of high surface area carbon used in conjunction with pretreatment to remove suspended and colloidal matter are apparent by comparing Cases 2 and 3. The reduced organic load achieved by pretreating changes the equilibrium solids balance to greatly reduced levels and the economies of carbon usage, reduced equipment size, and reduced solid wastes generation are evident. Further, the reduced inventory of biomass at equilibrium in the system provides solids handling room to add more carbon which has the effect of increasing the purification of the water produced. Surprisingly, this can be achieved at no increased carbon cost because the sludge age of the system can be easily doubled and tripled because of the improved sludge handling characteristics achieved by the pretreatment step.

The importance of pretreating waste water to minimize the concentration of contaminants for subsequent purification by the activated sludge process achieves a number of objectives.

The new principal objective of the ASU (Activated Sludge Unit) is to achieve water purity a significant degree lower in contaminants than heretofore achieved by the ASU. This increment will be achieved by a combination of (a) removal of suspended and colloidal matter from the feed, (b) high sludge age operating conditions, and (c) enhancement of the biosystem with powdered activated carbon with superior adsorption properties.

DRAWING

A waste water treating facility embodying our improved process is schematically illustrated in the attached Figure. This treating facility is described respecting a petroleum-chemical waste stream but the very same technology is applicable to municipal waste treatment and combined municipal/industrial waste treatment.

Typical contaminant water is the waste water from an oil refinery and waste water from a chemical plant. Table I below illustrates common characteristics of oil refinery waste water and Table II below illustrates common characteristics of waste water from a chemical plant.

TABLE I

REFINARY WASTE WATER CHARACTERISTICS AFTER PRIMARY TREATMENT IN API SEPARATOR
Median Values for Class C Refineries (USA)

| Parameters | Concentration, mg/liter |
| --- | --- |
| Biochemical Oxygen Demand, 5-day | 163 |
| Chemical Oxygen Demand | 473 |
| Total Organic Carbon | 160 |
| Oil and Grease | 51 |
| Phenolics | 11 |
| Suspended Solids | 52 |
| Ammonia | 48 |
| Sulfide | 2 |

TABLE II

SOME CHEMICAL PLANT WASTE WATER CHARACTERISTICS AFTER INPLANT PRETREATMENT

| Parameters | Concentration Range, mg/liter |
| --- | --- |
| Biochemical Oxygen Demand, 5-day | 50-5000 |
| Chemical Oxygen Demand | 500-20,000 |
| Suspended Solids | 30-100 |
| Ammonia | 50-250 |

Oil refining and chemical plant waste waters are commonly mixed together in the first compartment 29 of a multiple compartment equalization basin 12. The effluent from this basin 12 flows through valved line 31 into a bank of pressure filters 16, or alternatively a dissolved air flotation unit, and through a head tank 18 into a biological treating plant. Oil refinery waste water first flows into a sump 22 and then into a conventional API separator 24 where gross amounts of oil and solids are removed. Under normal conditions, the treatment facility 10 can handle a maximum design quantity of water per day. For example, a large facility may have a capacity of 25,000,000 gallons of water per day. Heavy rain storms, could, however, overload this facility. Consequently, a compartmented surge basin 26 is provided for holding abnormally large quantities of water, and as will be explained in detail below, for storing shock loads of contaminants such as acids of alkalis. A pump forwards any excess water from the sump 22 to this surge basin 26.

In accordance with one feature of our invention, the concentration of contaminants in the water flowing to the downstream biological treating plant is controlled so that variations in contaminant levels are equalized. The equalization basin 12 serves to level out or equalize contaminant concentration by passing the waste water through three separate compartments 29, 30 and 31 in the basin 12. When a sharp increase in the noxious contaminant is experienced in the influent to the basin 12, the initial effluent concentration from the third compartment 31 is lower and changes at a rate less than from a single compartment basin. This provides time for acclimation of the micro-organisms in the biological treating plant downstream.

Any sharp increase in contaminant concentration or any drastic change in the type of contaminants entering basin 12 has the greatest and most immediate impact on water quality conditions in compartment 29. When water from this first compartment 29 is mixed with the body of water in the second compartment 30, contaminant concentration is reduced. When the water from the second compartment 30 is mixed with the body of water in the third compartment 31, contaminant concentration is substantially reduced again. Mixing the water in this manner tends to dilute the contaminants so that their initial effluent concentration from the third compartment 31 is lower than if a single basin is used. Thus, if a slug of contaminants flows into the first compartment 29, this slug would be blended gradually in the quantities of water in the second and third compartments 30 and 31, be diluted and therefore initially would not increase or otherwise change the contaminant concentration or character by any substantial amount in the third compartment 31. As a consequence, the micro-organisms in the downstream biological treating plant acclimate to the slow exposure of the changes in contaminant concentration or character and adapt to biologically degrade this higher concentration of contaminants or different character of contaminants.

In accordance with another preferred feature of the invention, the average time the water is retained in the equalization basin 12 is maintained at a minimum. Thus, the heat in the water is retained at a maximum. High heat in water fosters increased biodegradation of contaminants in the treating plant 20. Average water temperature entering the plant 20 preferably ranges between 90° F. and 100° F.

The water in the first compartment 29 is monitored to determine the presence of especially noxious contaminants, for example, ammonia, phenolics, sulfides, acids, caustics, etc., so that their source may be traced and corrective action taken. In the second compartment 30 pH is controlled by addition of acids or alkalis that it is in the range of about 6.5 to 9.5 but preferably from about 7.5 to 8.5 when air oxidation of contaminants is required. This pH range is optimal for the oxidation reactions to occur and when desired the reactions are accelerated by adding hydroquinone or gallic acids.

Conventional floating aerators (not shown) float on the surface of the water in each compartment 29 through 31 and introduce air into the water to aerate and thoroughly mix the waste water. Such aerators (not shown) in compartment 30 mix and aerate to the desired dissolved oxygen levels. The preferred ratio of the aerators is 0.2 horsepower aeration or more per 1000 gallons compartment volume.

If for any reason the equalization pond 12 is flooded with an extremely high concentration of contaminant beyond handling capability, for example, if a line carrying acid broke, a valve 34 in a recycle line 36 is opened and the valve 38 in the filter inlet line 14 is closed. A pump 40 then pumps this highly acidic water to the shock load compartment 26a of a surge basin 26 where it is retained and gradually reintroduced into the first compartment 29 of the basin 12 through a valved line 42. This protects the downstream biological treating plant from being poisoned by shock loads of contaminants.

The mixing, aeration, pH control, chemical reactions, etc., taking place in equalization basin 12 causes coagulation and flotation of considerable contaminant matter. This matter is skimmed from the surface of the basin 12. Conventional slotted skim pipe (not shown) at the surface of the water in compartment 31 may be used.

The effluent from the final compartment 31 contains colloidal matter to which coagulants or flocculants such as aluminum or iron salts, and/or high molecular weight organic polyelectrolytes are added. The coagulants or flocculants destabilize, for removal by filtration or dissolved air flotation, the colloidal particles which are carried by the effluent from the basin 12 to the bank of filters 16. The filtered water passing into the head tank 18 is lifted by the pump 40. The preferred filter medium used in the bank of filters 16 is sand or a combination of sand and coal. It is important that the water flowing to the downstream biological treating plant be filtered to reduce chemical oxygen demand, suspended solids and oil to levels which do not interfere with the process. Under most conditions, the water flowing into the biological treating plant preferably must contain no more than twenty parts of dispersed hydrocarbons, such as oil and grease, per million parts of water and no more than twenty parts of oily suspended solids per million parts of water. Chemical oxygen demand is substantially reduced, generally by about fifty percent, and preferably consists essentially of solely soluble organic component of the waste water. Periodically, a filter unit in the bank of filters 16 must be backwashed. This is achieved by closing a valve in the feed line to the filter unit being backwashed and opening a valve in a backwash waste line (not shown) such that the effluents from the onstream filters are used for backwash water. One function of the head tank 18 is to provide a constant back pressure on the filtered water thereby providing a constant pressure backwash water source. The backwash water washes out the solids trapped in the filters, carrying them with the water into a sludge surge basin (not shown).

The biological treating plant has four process stages. A contact stage 44 where the contaminated water contacts a biologically active sludge 46. A clarifier stage 48 where sludge is separated from decontaminated water. A thickening stage 50 where separated sludge is thickened to remove excess water. And a digestion stage 52 where thickened sludge is digested. In the first stage 44 water essentially free of solid and oily matter contacts the activated sludge mass 46 in a contact tank 54 called a mixed liquor tank. This sludge 46 includes microorganisms which feed on the contaminants in the water. The metabolic processes of the microorganisms convert the contaminants to cellular structure of the organisms, carbon dioxide, and various intermediate products. In the second stage 48, water and activated sludge from the mixed liquor tank 54 flow into a clarifier tank 56 via a line 72. As will be explained further below, activated sludge from a second source is added to line 72 via line 100 and the combined sludges and water flow to clarifier tank 56. The line 72 and an isolated zone 84 of the clarifier tank 56 provide for contact of the second activated sludge recycle component and the residual contaminants in the water leaving the mixed liquor tank 54. This results in further purification of the water. Water is separated from these sludge particles by allowing the sludge particles 46 to settle on the bottom of the clarifier tank 56. Decontaminated water flows from the top of the clarifier through a second bank of filters 58 into a receiving stream 60, preferably through a bed of activated carbon 66 for removal of trace soluble contaminants before discharge to the receiving stream.

In the third stage 50, the sludge 46 withdrawn from the bottom of the clarifier tank 56 is concentrated and the bulk of any water retained by the sludge is separated and withdrawn. In the fourth stage 52, thickened sludge is held in a tank 62 for a period of time sufficient to allow the microorganisms to metabolize stored food material. This digested sludge is then spread over land and permitted to decompose and serve as a fertilizer. Alternately, the sludge can be incinerated.

In accordance with our invention, interstage aeration is provided to aerate the water as it flows into the biological treating plant and between four stages of the plant. The most important interstage aeration is the aeration of the streams of water and sludge flowing in lines 72 and 74 between first and second stages 44 and 48. Because of this aeration, the water leaving the clarifier tank and being discharged into a receiving body of water contains at least about one, preferably above about three, still more preferably about five parts of dissolved oxygen per million parts of water. This is highly desirable especially when carbon adsorption is employed. The oxygen in the discharged water from clarifier tank 56 maintains any microorganisms trapped in the filter 58 or following carbon bed aerobic. If there is insufficient air in this discharge water, the microorganisms trapped in the filter go anaerobic producing hydrogen sulfide which would contaminate the discharged water. In addition, the dissolved oxygen in the water in the clarifier tank 56 maintains the sludge 46 on the bottom of this tank aerobic, permitting the sludge to be retained in the thickener 50 and clarifier 48 longer than conventional. This provides more effective thickener and clarifier operation.

Interstage aeration is achieved by aspirating air into water flowing between tanks or positively injecting pressurized air into the transfer line. In addition to backwashing the bank of filters 16, the head of the water in the tank 18 can be utilized advantageously to aspirate air into the water flowing into the mixed liquor tank 54. The water level in the head tank 18 is above the water level of the mixed liquor tank 54. Water thus flows from the top of the head tank 18 downwardly through a line 64 and along a long generally horizontal line 66 which turns upwardly into a line 68 leading into the center of the mixed liquor tank 54. The horizontal line 66 is either at ground level or preferably below ground level to maximize the hydrostatic pressure. Thus, the air aspirated into the water is subjected to high pressure due to the water standing in the head and mixed liquor tanks 18 and 24. The horizontal line 66 can have a larger diameter than the downwardly extending line 64 or purposely be extended by looping, for example, so that dwell time of the water and air mix can be extended. This substantially saturates or even supersaturates with respect to atmospheric pressure the water entering the mixed liquor tank 54 with dissolved oxygen. Commonly this water flowing into the mixed liquor tank 54 will contain at least about 6 to 8 parts of dissolved oxygen per million parts of water and may reach levels above saturation of about 12 parts of dissolved oxygen per million parts of water. In a similar manner, air is aspirated or pressured into the water flowing from the mixed liquor tank 54 into the clarifier tank 56. The vertical line 72 transfers the water and suspended sludge particles downwardly to the horizontal line 74 which turns upward into a line 76 terminating near the surface of the clarifier tank 56. An aspirator 78 sucks air into the downward flowing water in the line 72. The water elevation in the tanks 54 and 56 subject the air-water mixture to high pressure as it flows through the line 74. This can saturate or supersaturate the water with dissolved oxygen.

The clarifier tank 56 is designed to receive the water from the upwardly extending line 76 into a confined mixing region formed by cylindrical baffle 82 roughly concentric with the side of the tank. The diameter of cylindrical baffle 82 is preferably about ½ the diameter of the clarifier 56 and extending to about six feet from the bottom. Line 76 upwardly extends to well within the circular baffle 82 and, as the air-water mix exits line 76, the air lift pumping action creates a turbulent zone 84 in the center of the clarifier tank 56 that provides for further activated sludge-water contact, oxygen transfer and flocculation. The preferred contact time in line 76 and turbulent zone 84 is at least 20 minutes. The clarifier tank 56 includes weirs 80 at the top of the tank that maintains the water level and provides for discharge of clarified water from the quiescent zone 86. Activated sludge particles settle to the bottom of the tank where they are withdrawn by a conveyor and pump 88 system.

In our process, air under pressure from sources 90 and 92 may be injected into the sludge flowing between the clarifier tank 56 and thickener 50 and between the thickener 50 and the digester 52. This high pressure aeration of sludge permits the sludge to be maintained in the clarifier tank 56 and thickener 50 for periods in excess of what is normally considered feasible in the activated sludge process. For example, the activated sludge-water mass in the feed to the thickener and clarifier in the normal system contains 1 mg $O_2$/liter or less. As the sludge blanket settles the dissolved oxygen in the interstitial water is rapidly depleted by the respiration of the microorganisms and the facultative organisms start to remove oxygen from the nitrogen and sulfur compounds present in the water. This released hydrogen sulfide and nitrogen gas upsets the sludge settling process and seriously degrades water quality. In our process about ten times the dissolved oxygen concentration can be provided compared to conventional practice. This greatly decreases the rate at which septicity occurs and alleviates substantially the problems associated with retaining the sludge in the clarifier and thickener until the excess water is substantially removed.

Another aspect of our invention relates to the use of sludges with different properties recycled to different points to achieve different functions, all in a single activated sludge plant. As conventional, sludge withdrawn from the clarifier tank 56 is recycled through valved branched line 94 into the mixed liquor tank 54 with excess sludge to the thickener 50. A portion of this recycled sludge is introduced through branch 96 into the sludge-water mix flowing between the mixed liquor tank 54 and the clarifier 56. This absorptive sludge portion entering via line 96 has capacity to absorb and store residual soluble contaminants and improve the flocculating properties of the total sludge mass for improved separation in clarifier 56. The interstage aeration and clarifier design provides for contact time, mixing and aeration to optimize the capacity of this system. Similarly, the recycle sludge could be routed through the thickener 50 and via line 98 into the sludge-water mix flowing between the mixed liquor tank 54 and the clarifier tank 56. Sludge from the thickener 50 has been without food longer and therefore has greater absorptive and storage capacity and is contained in a reduced volume because of the dewatering action of the thickener. Maintaining the thickener sludge aerobic using interstage aeration is conducive to maintenance of sludge quality for recycle from the thickener 50. Another source in our process of the recycle sludge is obtained by routing that sludge through the thickener 50, the aerobic digester 52, and the valved line 100 into the sludge-water mix flowing in line 72 between the mixed liquor tank 54 and the clarifier tank 56. The sludge component from the aerobic digester 52 has had typically one to four weeks to acclimate to the residual refractory substrate contaminants. This acclimated sludge is especially effective for absorbing and biodegrading the residual substrate in the water exiting mixed liquor tank 54. When the combined sludge mass enters clarifier 56, the acclimated sludge combines with sludge in the clarifier tank 56 and seeds the sludge being recycled to the mixed liquor tank 54 via line 94. Seeding the main recycle sludge mass continuously with sludge acclimated to residual, refractory materials shifts the equilibrium to increase removal of these contaminants by the main sludge mass in the mixed liquor tank 54. After equilibrium is attained there is no longer high concentrations of refractory substrate in the water leaving the clarifier tank 54. Introduction of any new refractory materials into the system causes the rapid development of acclimated organisms.

Activated carbon is commonly added so that it is present in either or both of the first or second stages of the biological plant. Preferred points of addition are at line 72 to water leaving the first stage, at line 73 to purified water leaving the second stage but prior to final filtration, and at line 100 to digested sludge from the fourth stage which later is mixed with water and sludge entering the second stage.

As evident to those skilled in the art, modifications can be made in the described process without departing from the principles of the invention claimed herein. For example, oxygen may be substituted for air in the interstage aeration system, or a dissolved air flotation unit may be substituted for a filtration unit.

We claim:

1. In the activated sludge process wherein a first stage contaminated water is contacted with activated sludge for a period of time sufficient to biologically degrade contaminants in the water and in a second stage decontaminated water is separated from the activated sludge, a first portion of said separated sludge being recycled for recontact with the water in the first stage and a second portion of said separated sludge being treated in downstream operations, the improvement comprising pretreating the contaminated water entering the first stage so that the water contains less than about 20 ppm of hydrocarbons and less than about 20 ppm of solids; introducing 1 to 40 ppm based on feed waste water of activated carbon having a zeta potential of at least about $-10$ millivolts into the water so that the carbon is present in the first and/or second stage; and maintaining the average age of the activated sludge in the first and second stages in excess of ten days.

2. The process of claim 1 wherein the carbon has a surface area of at least about 1500 square meters per gram.

3. The process of claim 1 wherein the carbon has a surface area of at least about 2000 square meters per gram.

4. The process of claim 1 wherein oxygen is introduced into the water and sludge mix entering the second stage so that the sludge in the second zone is maintained in a aerobic state and separated decontaminated water from said second stage contains dissolved oxygen.

5. The process of claim 4 wherein the water from the second stage contains at least about one part of dissolved oxygen per million parts of water.

6. The improved process of claim 1 wherein the oxygen is introduced into the water and sludge mix entering the second stage by introducing air into a stream of the water and sludge mix flowing between the first and second stages.

7. The improved process of claim 6 wherein the oxygen in the stream of water and sludge mix flowing between the first and second stage is subjected to a high pressure produced by hydrostatic heads of liquid in the first and second stages.

8. The improved process of claim 1 where a part of the first portion of the separated recycle sludge is mixed with the stream of water and sludge mix flowing between the first and second stages.

9. The improved process of claim 1 where said second portion of the sludge treated in downstream operations is forwarded through a third stage for thickening, and the thickened sludge from the third stage is forwarded to a fourth stage for digestion.

10. The improved process of claim 9 where a portion of the thickened sludge from the third stage is mixed with the water and sludge mix entering the second stage.

11. The improved process of claim 9 where a portion of the digested sludge from the fourth stage is mixed with the water and sludge mix entering the second stage.

12. The improved process of claim 1 where oxygen is introduced into the contaminated water entering the first stage by aspirating air into a stream of said water.

13. The improved process of claim 12 wherein the oxygen in the stream of water entering the first stage is subjected to high pressure produced by a hydrostatic head of liquor.

14. The improved process of claim 9 where oxygen is introduced into the sludge flowing between the second and third stages, and between the third and fourth stages.

15. The process of claim 1 wherein the activated carbon is introduced after the first stage.

16. The process of claim 1 wherein the activated carbon is introduced to the water leaving the first stage.

17. The process of claim 1 wherein the activated carbon is introduced after the second stage.

18. The process of claim 1 wherein the activated carbon is introduced to the decontaminated water leaving the second stage.

19. The process of claim 18 wherein water leaving the second stage is subjected to filtration by filters subsequent to the introduction of activated carbon.

20. The process of claim 19 wherein the filters are occasionally backwashed to reduce filter plugging and remove activated carbon and residual organic material.

21. The process of claim 20 wherein the activated carbon and residual organic material are backwashed to the first stage.

22. The process of claim 19 wherein said second portion of the sludge treated in downstream operations is forwarded through a third stage for thickening, and the thickened sludge from the third stage is forwarded to fourth stage for digestion, and wherein the activated carbon and residual organic material are backwashed to the fourth stage.

23. The process of claim 11 wherein the activated carbon is introduced into the portion of the digested sludge from the fourth stage which is mixed with the water and sludge entering the second stage.

24. The process of claim 1 wherein the contaminated water undergoes intermediate treatment prior to the activated sludge process comprising passing the water through an equalization zone including at least two separate water retention compartments in series so that the water is mixed in each compartment and flows from one compartment to the next compartment and a given quantity of water is retained for predetermined period in each of said compartments, introducing air into the water in at least one of the compartments so that the water in the compartment is vigorously agitated and the effluent in the aerated compartment includes at least one part of dissolved oxygen per million parts of water, adjusting the pH of the water in the equalization zone so that the pH of the water in one of the compartments and in the effluent from said zone ranges between about 6.5 and about 9.5, destabilizing colloidal particles suspended in the water, and treating by filtration or dissolved air flotation the effluent water from the equalization zone so that said filtered water includes no more than about twenty parts of hydrocarbons per million parts of water and no more than about twenty parts of suspended solids per million parts of water.

25. The process of claim 1 wherein the carbon has a surface area greater than about 2500 square meters per gram.

26. The process of claim 1 wherein the average sludge age is greater than about 20 days.

27. The process of claim 1 wherein the first stage is operated at an average sludge age in excess of thirty days.

28. The process of claim 1 wherein the carbon has a zeta potential in the range of about $-5$ to about $+5$ millivolts.

29. In the activated sludge process wherein a first stage contaminated water is contacted with activated sludge for a period of time sufficient to biologically degrade contaminants in the water and in a second stage decontaminated water is separated from the activated sludge, a portion of said separated sludge being recycled for recontact with water in the first stage, the improvement comprising introducing about 1 to about 500 ppm of activated carbon into the water so that the carbon is present in the first or second stages, said carbon having a zeta potential of at least about −10 millivolts.

30. The process of claim 29 wherein said carbon has a zeta potential of about −5 to about +5 millivolts.

31. In a waste water treating process wherein waste water having a pH of from about 4 to about 11 is contacted with activated carbon, the improvement comprising maintaining the zeta potential of the carbon at least about −10 millivolts.

32. The process of claim 31 wherein polyelectrolytes are added to the waste water in order to control the zeta potential.

33. In the activated sludge process wherein a first stage contaminated water is contacted with activated sludge for a period of time sufficient to biologically degrade contaminants in the water and in a second stage decontaminated water is separated from the activated sludge, a portion of said separated sludge being recycled for recontact with water in the first stage, the improvement comprising
pretreating the waste water prior to the first stage to reduce the chemical oxygen demand of the waste water by fifty percent;
operating the first or second stages in the presence of activated carbon having a zeta potential of at least about −10 millivolts by the addition of 1–40 ppm activated carbon based on feed water; and
maintaining the average sludge age in excess of 10 days.

34. The process of claim 33 wherein the contaminated feed water is pretreated to reduce chemical oxygen demand by seventy percent.

35. The process of claim 33 wherein the water is pretreated to reduce chemical oxygen demand to consist of essentially only the soluble organic component.

36. In the activated sludge process wherein a first stage contaminated water is contacted with activated sludge for a period of time sufficient to biologically degrade contaminants in the water and in a second stage decontaminated water is separated from the activated sludge, a first portion of said separated sludge being recycled for recontact with the water in the first stage and a second portion of said separated sludge being treated in downstream operations, the improvement comprising pretreating the contaminated water entering the first stage so that the water contains less than about 20 ppm of dispersed hydrocarbons and less than about 20 ppm of solids;
introducing 1 to 40 ppm based on feed waste water of activated carbon into the waste water so that the carbon is present in the first and/or second stage; and
maintaining the average age of the activated sludge in the first and second stages in excess of ten days.

37. The process of claim 36 wherein the carbon has a surface area of at least about 1500 square meters per gram.

38. The process of claim 36 wherein the carbon has a surface area of at least about 2000 square meters per gram.

39. The process of claim 36 wherein oxygen is introduced into the water and sludge mix entering the second stage so that the sludge in the second zone is maintained in an aerobic state and separated decontaminated water from said second stage contains dissolved oxygen.

40. The process of claim 39 wherein the water from the second stage contains at least about one part of dissolved oxygen per million parts of water.

41. The improved process of claim 36 wherein the oxygen is introduced into the water and sludge mix entering the second stage by introducing air into a stream of the water and sludge mix flowing between the first and second stages.

42. The improved process of claim 41 wherein the oxygen in the stream of water and sludge mix flowing between the first and second stages is subjected to a high pressure produced by hydrostatic heads of liquid in the first and second stages.

43. The improved process of claim 36 where a part of the first portion of the separated recycle sludge is mixed with the stream of water and sludge mix flowing between the first and second stages.

44. The improved process of claim 36 where said second portion of the sludge treated in downstream operations is forwarded through a third stage for thickening, and the thickened sludge from the third stage is forwarded to a fourth stage for digestion.

45. The improved process of claim 44 where a portion of the thickened sludge from the third stage is mixed with the water and sludge mix entering the second stage.

46. The improved process of claim 44 where a portion of the digested sludge from the fourth stage is mixed with the water and sludge mix entering the second stage.

47. The improved process of claim 36 where oxygen is introduced into the contaminated water entering the first stage by aspirating air into a stream of said water.

48. The improved process of claim 47 wherein the oxygen is the stream of water entering the first stage is subjected to high pressure produced by a hydrostatic head of liquor.

49. The improved process of claim 44 where oxygen is introduced into the sludge flowing between the second and third stages, and between the third and fourth stages.

50. The process of claim 36 wherein the activated carbon is introduced after the first stage.

51. The process of claim 36 wherein the activated carbon is introduced to the water leaving the first stage.

52. The process of claim 36 wherein the activated carbon is introduced after the second stage.

53. The process of claim 36 wherein the activated carbon is introduced to the decontaminated water leaving the second stage.

54. The process of claim 53 wherein water leaving the second stage is subjected to filtration by filters subsequent to the introduction of activated carbon.

55. The process of claim 54 wherein the filters are occasionally backwashed to reduce filter plugging and remove activated carbon and residual organic material.

56. The process of claim 55 wherein the activated carbon and residual organic material are backwashed to the first stage.

57. The process of claim 54 wherein said second portion of the sludge treated in downstream operations is forwarded through a third stage for thickening, and the thickened sludge from the third stage is forwarded to the fourth stage for digestion, and wherein the activated carbon and residual organic material are backwashed to the fourth stage.

58. The process of claim 46 wherein the activated carbon is introduced into the portion of the digested sludge from the fourth stage which is mixed with the water and sludge entering the second stage.

59. The process of claim 36 wherein the contaminated water undergoes intermediate treatment prior to the activated sludge process comprising passing the water through an equalization zone including at least two separate water retention compartments in series so that the water is mixed in each compartment and flows from one compartment to the next compartment and a given quantity of water is retained for predetermined period in each of said compartments, introducing air into the water in at least one of the compartments so that the water in the compartment is vigorously agitated and the effluent in the aerated compartment includes at least one part of dissolved oxygen per million parts of water, adjusting the pH of the water in the equalization zone so that the pH of the water in one of the compartments and in the effluent from said zone ranges between about 6.5 and about 9.5, destabilizing colloidal particles suspended in the water, and treating by filtration or dissolved air flotation the effluent water from the equalization zone so that said filtered water includes no more than about twenty parts of hydrocarbons per million parts of water and no more than about twenty parts of suspended solids per million parts of water.

60. The process of claim 36 wherein the carbon has a surface area greater than about 2500 square meters per gram.

61. The process of claim 36 wherein the average sludge age is greater than about 20 days.

62. The process of claim 36 wherein the first stage is operated at an average sludge age in excess of thirty days.

63. In the activated sludge process wherein a first stage contaminated water is contacted with activated sludge for a period of time sufficient to biologically degrade contaminants in the water and in a second stage decontaminated water is separated from the activated sludge, a portion of said separated sludge being recycled for recontact with water in the first stage, the improvement comprising pretreating the waste water prior to the first stage to reduce the chemical oxygen demand of the waste water by fifty percent;

operating the first or second stages in the presence of activated carbon by the addition of 1–40 ppm activated carbon based on feed waste water; and maintaining the average sludge age in excess of 10 days.

64. The process of claim 63 wherein the waste water is pretreated to reduce chemical oxygen demand by seventy percent.

65. The process of claim 63 wherein the waste water is pretreated to reduce chemical oxygen demand to consist of essentially only the soluble organic component.

* * * * *